United States Patent
Rosenblatt et al.

(10) Patent No.: US 10,721,993 B2
(45) Date of Patent: Jul. 28, 2020

(54) INTELLIGENT OFFLOADING INSOLE DEVICE

(71) Applicants: ROSALIND FRANKLIN UNIVERSITY OF MEDICINE AND SCIENCE, North Chicago, IL (US); THE BOARD OF TRUSTEES OF THE UNIVERSITY OF ILLINOIS, Urbana, IL (US)

(72) Inventors: Noah J. Rosenblatt, North Chicago, IL (US); Ryan Crews, North Chicago, IL (US); Farid Amirouche, Highland Park, IL (US)

(73) Assignees: Rosalind Franklin University of Medicine and Science, North Chicago, IL (US); The Board of Trustees of the University of Illinois, Urbana, IL (US)

( * ) Notice: Subject to any disclaimer, the term of this patent is extended or adjusted under 35 U.S.C. 154(b) by 18 days.

(21) Appl. No.: 15/813,613

(22) Filed: Nov. 15, 2017

(65) Prior Publication Data

US 2018/0132566 A1 May 17, 2018

Related U.S. Application Data

(60) Provisional application No. 62/422,187, filed on Nov. 15, 2016.

(51) Int. Cl.
  *A43B 17/03* (2006.01)
  *A43B 13/20* (2006.01)
  (Continued)

(52) U.S. Cl.
  CPC .......... *A43B 17/035* (2013.01); *A43B 3/0005* (2013.01); *A43B 13/20* (2013.01); *A43B 17/026* (2013.01); *G05B 15/02* (2013.01)

(58) Field of Classification Search
  CPC ..... A43B 3/0005; A43B 17/03; A43B 17/035; A43B 13/20; A43B 13/203
  (Continued)

(56) References Cited

U.S. PATENT DOCUMENTS 5,205,055 A * 4/1993 Harrell ................. A43B 5/1633
                                                              36/50.1
5,257,470 A   11/1993 Auger et al.
(Continued)

OTHER PUBLICATIONS

Najafi et al., "Smarter Sole Survival: Will Neuropathic Patients at High Risk for Ulceration Use a Smart Insole-Based Foot Protection System?," Journal of Diabetes Science and Technology (2017).
(Continued)

*Primary Examiner* — Marie D Bays
(74) *Attorney, Agent, or Firm* — McDonnell Boehnen Hulbert & Berghoff LLP

(57) ABSTRACT

A plantar surface pressure offloading system includes an insole capable of coupling with a shoe and interfacing with a foot. A number of compressible bladders and pressure sensors are coupled to the insole. Each bladder has an adjustable compressibility, and each pressure sensor is configured to measure a pressure exerted on a respective portion of the foot. A controller of the system can perform, for each compressible bladder, a compressibility adjustment process including (i) receiving, from a respective pressure sensor associated with a respective bladder, a signal indicative of a pressure exerted on a respective portion of the foot, (ii) determining, based on the signal, that the pressure exerted on the respective portion of the foot exceeds a threshold pressure, and (iii) responsive to the determination, adjusting the compressibility of the respective bladder, thereby offloading pressure from the respective portion of the foot to a different portion of the foot.

20 Claims, 7 Drawing Sheets

(51) Int. Cl.
*A43B 3/00* (2006.01)
*A43B 17/02* (2006.01)
*G05B 15/02* (2006.01)

(58) Field of Classification Search
USPC .............................................. 36/88, 93, 29
See application file for complete search history.

(56) References Cited

U.S. PATENT DOCUMENTS

| | | | |
|---|---|---|---|
| 5,813,142 A | 9/1998 | Demon | |
| 5,839,210 A * | 11/1998 | Bernier | A43B 1/0072 36/50.1 |
| 5,906,767 A | 5/1999 | Karol et al. | |
| 5,934,599 A * | 8/1999 | Hammerslag | A43C 1/00 242/396.1 |
| 6,032,387 A * | 3/2000 | Johnson | A43C 1/06 36/118.1 |
| 6,852,251 B2 | 2/2005 | Sheng et al. | |
| 7,107,706 B1 * | 9/2006 | Bailey, Sr. | A43B 3/0005 36/29 |
| 7,200,956 B1 | 4/2007 | Kotha et al. | |
| 7,631,382 B2 | 12/2009 | DiBenedetto et al. | |
| 7,752,774 B2 * | 7/2010 | Ussher | A43B 3/0005 36/100 |
| 8,046,937 B2 * | 11/2011 | Beers | A43B 3/0005 36/50.1 |
| 8,056,268 B2 | 11/2011 | DiBenedetto et al. | |
| 9,271,538 B2 | 3/2016 | Ellis | |
| 9,861,164 B2 * | 1/2018 | Beers | A43B 3/0005 |
| 10,201,212 B2 * | 2/2019 | Beers | A43C 11/165 |
| 10,238,180 B2 * | 3/2019 | Beers | A43B 3/0005 |
| 2001/0045104 A1 | 11/2001 | Bailey, Sr. et al. | |
| 2003/0009913 A1 | 1/2003 | Potter et al. | |
| 2004/0134099 A1 * | 7/2004 | Jones | A43C 11/008 36/50.1 |
| 2005/0198867 A1 * | 9/2005 | Labbe | A43B 11/00 36/50.1 |
| 2005/0217142 A1 * | 10/2005 | Ellis, III | A43B 3/0005 36/25 R |
| 2005/0268487 A1 * | 12/2005 | Ellis, III | A43B 3/0005 36/25 R |
| 2006/0248749 A1 * | 11/2006 | Ellis | A43B 3/0005 36/28 |
| 2006/0248750 A1 | 11/2006 | Rosenberg | |
| 2008/0010854 A1 * | 1/2008 | Sokolowski | A43B 5/12 36/8.3 |
| 2011/0131839 A1 | 6/2011 | Bailin et al. | |
| 2012/0109013 A1 | 5/2012 | Everett et al. | |
| 2014/0165427 A1 * | 6/2014 | Molyneux | A43B 13/203 36/102 |
| 2014/0230276 A1 | 8/2014 | Campos, II et al. | |
| 2015/0013184 A1 * | 1/2015 | Beers | A43C 11/004 36/83 |
| 2016/0174657 A1 * | 6/2016 | Fox-Mudge | A43B 13/203 36/29 |
| 2016/0345670 A1 * | 12/2016 | Orand | A43B 13/189 |
| 2017/0265572 A1 * | 9/2017 | Beers | A43C 11/14 |
| 2017/0265573 A1 * | 9/2017 | Beers | A43B 3/0005 |
| 2017/0265575 A1 * | 9/2017 | Beers | A43B 3/0005 |
| 2017/0265576 A1 * | 9/2017 | Beers | A43B 3/0005 |
| 2017/0265585 A1 * | 9/2017 | Orand | A43B 3/0005 |
| 2017/0336781 A1 * | 11/2017 | Livaccari | G05B 19/4155 |
| 2018/0008005 A1 * | 1/2018 | Compton | A43B 13/186 |
| 2018/0035921 A1 * | 2/2018 | Chang | A61B 5/486 |
| 2018/0125168 A1 * | 5/2018 | Beers | A43B 3/0005 |
| 2018/0153263 A1 * | 6/2018 | Beers | A43B 3/0005 |
| 2018/0184750 A1 * | 7/2018 | Winger | A43B 17/006 |
| 2018/0271181 A1 * | 9/2018 | Ellis | G05B 19/048 |
| 2019/0000183 A1 * | 1/2019 | Mou | A43B 13/203 |
| 2019/0098963 A1 * | 4/2019 | Beers | A43C 11/165 |

OTHER PUBLICATIONS

Ferber et al., "Validation of Plantar Pressure Measurements for a Novel In-Shoe Plantar Sensory Replacement Unit," Journal of Diabetes Science and Technology, vol. 7, Issue 5, pp. 1167-1175 (Sep. 2013).

Orpyx Medical Technologies, SurroSense RX, https://orpyx.com/pages/surrosense-rx (last visited Dec. 4, 2017).

Novel, pedar sensole system, http://novel.de/novelcontent/pedar (last visited Dec. 4, 2017).

Tekscan, Inc., F-Scan In-Shoe Analysis System, https://www.tekscan.com/products-solutions/systems/f-scan-system (last visited Dec. 4, 2017).

Orlin et al., "Plantar Pressure Assessment," Physical Therapy, vol. 80, No. 4, pp. 399-409 (Apr. 2000).

Williams et al., "Clinical Uses of In-Shoe Pressure Analysis in Podiatric Sports Medicine," Journal of the American Podiatric Medical Association, vol. 97, No. 1, pp. 49-58 (Jan./Feb. 2007).

International Search Report, International Searching Authority, for International Application No. PCT/US2017/061711, dated Dec. 29, 2017, pp. 1-3.

Notification of Transmittal of International Search Report and Written Opinion, International Searching Authority, for International Application No. PCT/US2017/061711, dated Jan. 30, 2018, pp. 1-8.

Armstrong, D.G., et al., "Mind the Gap: Disparity Between Research Funding and Costs of Care for Diabetic Foot Ulcers", Diabetes Care, 2013, vol. 36(7), pp. 1815-1817.

Blumberg, S.N., et al., "Disparities in Initial Presentation and Treatment Outcomes of Diabetic Foot Ulcers in a Public, Private, and Veterans Administration Hospital", J. Diabetes, 2014, vol. 6(1), pp. 68-75.

Boyko, E.J., et al., "Prediction of Diabetic Foot Ulcer Using Readily Available Clinical Information: The Seattle Diabetic Foot Study", Diabetes, 2002, vol. 51, (Suppl 2), p. A18.

Bus, S.A., et al., "Specific Guidelines on Footwear and Offloading", Diabetes Metab. Res. Rev., 2008, vol. 24, Suppl 1, pp. S192-S193.

Bus, S.A., et al., "The Effectiveness of Footwear and Offloading Interventions to Prevent and Heal Foot Ulcers and Reduce Plantar Pressure in Diabetes: a Systematic Review", Diabetes Metab. Res. Rev., 2008, vol. 24, Suppl 1, pp. S162-S180.

Bus, S.A., et al., "Effect of Custom-Made Footwear on Foot Ulcer Recurrence in Diabetes: a Multicenter Randomized Controlled Trial", Diabetes Care, 2013, vol. 36(12), pp. 4109-4116.

Cavanagh, P.R., et al., "Treatment for Diabetic Foot Ulcers", Lancet, 2005, vol. 366(9498), pp. 1725-1735.

Chao, S.Y., et al., "Estimating Diabetes Prevalence in the Military Health System Population from 2006 to 2010", Mil. Med., 2013, vol. 178(9), pp. 986-993.

Crews, R.T., et al., "A Growing Troubling Triad: Diabetes, Aging, and Falls", J. Aging Res., 2013, vol. 2013, p. 342650.

Dallimore, S.M., et al., "Tendon Lengthening and Fascia Release for Healing and Preventing Diabetic Foot Ulcers: a Systematic Review and Meta-Analysis", J. Foot Ankle Res., 2015, vol. 8, p. 33.

Driver, V.R., et al., "The Costs of Diabetic Foot: the Economic Case for the Limb Salvage Team", J. Vasc. Surg., 2010, vol. 52(3 Suppl), pp. 17S-22S.

Gibson, L.W., et al., "Limb Salvage for Veterans with Diabetes: to Care for Him Who Has Borne the Battle", Crit. Care Nurs. Clin. North Am., 2013, vol. 25(1), pp. 131-134.

Lavery, L.A., et al., "Diabetes-Related Lower-Extremity Amputations Disproportionately Affect Blacks and Mexican Americans", South Med. J., 1999, vol. 92(6), pp. 593-599.

Miller, D.R., et al., "Who has Diabetes? Best Estimates of Diabetes Prevalence in the Department of Veterans Affairs Based on Computerized Patient Data", Diabetes Care, 2004, vol. 27, Suppl 2, pp. B10-B21.

(56) References Cited

OTHER PUBLICATIONS

Molines-Barroso, R.J., et al., "Analysis of Transfer Lesions in Patients who Underwent Surgery for Diabetic Foot Ulcers Located on the Plantar Aspect of the Metatarsal Heads", Diabet. Med., 2013, vol. 30(8), pp. 973-976.

Najafi, B., et al., "Importance of Time Spent Standing for those at Risk of Diabetic Foot Ulceration" Diabetes Care, 2010, vol. 33(11), pp. 2448-2450.

Najafi, B., et al., "Can't Stand the Pressure: The Association Between Unprotected Standing, Walking, and Wound Healing in People with Diabetes", J. Diabetes Sci. Technol., 2016, pp. 1-11.

Owings, T.M., et al., "Plantar Pressures in Diabetic Patients with Foot Ulcers Which Have Remained Healed", Diabetic Medicine, 2009, vol. 26(11), pp. 1141-1146.

Peters, E.J., et al., "International Working Group on the Effectiveness of the Diabetic Foot Risk Classification System of the International Working Group on the Diabetic Foot", Diabetes Care, 2001, vol. 24(8), pp. 1442-1447.

Reiber, G.E., et al., "A Comparison of Diabetic Foot Ulcer Patients Managed in VHA and non-VHA Settings", J. Rehabil. Res. Dev., 2001, vol. 38(3), pp. 309-317.

Singh, N., et al., "Preventing Foot Ulcers in Patients with Diabetes", Jama, 2005, vol. 293(2), pp. 217-228.

Waaijman, R., et al., "Pressure-Reduction and Preservation in Custom-Made Footwear of Patients with Diabetes and a History of Plantar Ulceration", Diabet. Med., 2012, vol. 29(12), pp. 1542-1549.

Wrobel, J.S., et al., "Creating a Diabetes Foot Reminder-Based Registry Using the Electronic Medical Record", Inform. Prim. Care, 2010, vol. 18(4), pp. 283-287.

Wrobel, J.S., et al., "Diabetes-Related Foot Care at 10 Veterans Affairs Medical Centers: Must Do's Associated with Successful Microsystems", Jt Comm. J. Qual. Patient Saf, 2006, vol. 32(4), pp. 206-213.

Wu, S.C., et al., "The Pivotal Role of Offloading in the Management of Neuropathic Foot Ulceration", Curr. Diab. Rep., 2005, vol. 5(6), pp. 423-429.

\* cited by examiner

INTELLIGENT OFFLOADING INSOLE DEVICE

CROSS REFERENCE TO RELATED APPLICATION

The present application claims priority to U.S. Provisional patent application Ser. No. 62/422,187 filed on Nov. 15, 2016, the entire contents of which are herein incorporated by reference.

BACKGROUND

Orthotic inserts can be added to footwear to provide improved support or comfort to a plantar surface of a person's foot. These inserts may include various contours for passively controlling how the foot is oriented within the footwear. Examples of such inserts include arch supports, insoles, heel liners, and foot cushions, each of which can include a compressible material, such as a gel or foam.

SUMMARY

The present disclosure is directed to systems and methods for actively offloading pressure from localized plantar surface areas to one or more other plantar surface areas.

In some examples, a system is provided. The system includes an insole capable of coupling with a shoe and interfacing with a foot. A plurality of bladders are coupled to the insole, and each bladder of the plurality of bladders has an adjustable compressibility. A plurality of pressure sensors are also coupled to the insole, and each pressure sensor of the plurality of pressure sensors is configured to measure a pressure exerted on a respective portion of the foot. Each pressure sensor of the plurality of pressure sensors is associated with a respective bladder of the plurality of bladders. The system further includes a controller configured to perform a compressibility adjustment process for each bladder of the plurality of bladders. The compressibility adjustment process includes (i) receiving, from a respective pressure sensor associated with a respective bladder, a signal indicative of a pressure exerted on a respective portion of the foot, (ii) determining, based on the received signal, that the pressure exerted on the respective portion of the foot exceeds a threshold pressure, and (iii) responsive to determining that the pressure exerted on the respective portion of the foot exceeds the threshold pressure, adjusting the compressibility of the respective bladder, thereby offloading pressure from the respective portion of the foot to a different portion of the foot.

In some examples of the system, adjusting the compressibility of the respective bladder includes increasing the compressibility of the respective bladder, and the compressibility adjustment process further includes, responsive to determining that the pressure exerted on the respective portion of the foot exceeds the threshold pressure, decreasing or increasing the compressibility of one or more bladders different from the respective bladder.

In some examples of the system, each bladder of the plurality of bladders includes (i) a fluid having a compressibility that varies based on an electromagnetic field applied to the fluid and (ii) a controllable electromagnetic source configured to apply a variable electromagnetic field to the fluid, and adjusting the compressibility of the respective bladder includes causing the electromagnetic source of the respective bladder to adjust the electromagnetic field applied to the fluid of the respective bladder.

In some examples of the system, each bladder of the plurality of bladders includes a fluid, the compressibility of each bladder depends on an amount of the fluid in the bladder, the system further comprises a pump configured to pump the fluid to or from each bladder, and adjusting the compressibility of the respective bladder includes causing the pump to pump the fluid to or from the respective bladder.

In some examples of the system, the controller is configured to perform the compressibility adjustment process sequentially for each bladder of the plurality of bladders.

In some examples of the system, the controller is configured to perform the compressibility adjustment process concurrently for all bladders of the plurality of bladders.

In some examples of the system, the controller is configured to, prior to performing the compressibility adjustment process for each bladder of the plurality of bladders, adjust the compressibility of each bladder to a baseline compressibility.

In some examples of the system, the baseline compressibility is approximately equal to a compressibility of the insole.

In some examples of the system, the compressibility adjustment process further includes (i) after adjusting the compressibility of the respective bladder, receiving, from the respective pressure sensor associated with the respective bladder, a subsequent signal indicative of the pressure exerted on the respective portion of the foot, (ii) determining, based on the subsequent signal, that the pressure exerted on the respective portion of the foot does not exceed the threshold pressure, and (iii) responsive to determining that the pressure exerted on the respective portion of the foot does not exceed the threshold pressure, maintaining the compressibility of the respective bladder.

In some examples of the system, adjusting the compressibility of the respective bladder includes adjusting the compressibility of the respective bladder in increments until the pressure exerted on the respective portion of the foot does not exceed the threshold pressure.

In some examples of the system, performing the compressibility adjustment process for each bladder of the plurality of bladders adjusts a center of pressure under the foot, thereby affecting how force is applied through the foot to one or more lower-extremity joints.

In some examples of the system, the controller is configured to receive one or more signals from an external computing device specifying a value of the threshold pressure.

In some examples of the system, a value of the threshold pressure depends on which respective bladder of the plurality of bladders the controller performs the compressibility adjustment process for.

In some examples, another system is provided. The system includes a shoe configured to be worn on a foot. A plurality of bladders are coupled to the shoe, and each bladder of the plurality of bladders has an adjustable compressibility. A plurality of pressure sensors are also coupled to the shoe, and each pressure sensor of the plurality of pressure sensors is configured to measure a pressure exerted on a respective portion of the foot. Each pressure sensor of the plurality of pressure sensors is associated with a respective bladder of the plurality of bladders. The system further includes a controller configured to perform a compressibility adjustment process for each bladder of the plurality of bladders. The compressibility adjustment process includes (i) receiving, from a respective pressure sensor associated with a respective bladder, a signal indicative of a pressure exerted on a respective portion of the foot, (ii) determining, based on the received signal, that the pressure exerted on the respective portion of the foot exceeds a threshold pressure, and (iii) responsive to determining that the pressure exerted on the respective portion of the foot exceeds the threshold pressure, adjusting the compressibility of the respective bladder, thereby offloading pressure from the respective portion of the foot to a different portion of the foot.

In some examples, a method is provided. The method includes performing a compressibility adjustment process for each bladder of a plurality of compressible bladders. The plurality of compressible bladders are coupled to an insole that is capable of interfacing with a foot, and each bladder of the plurality of compressible bladders has an adjustable compressibility. Further, each bladder of the plurality of compressible bladders is associated with a respective pressure sensor of a plurality of pressure sensors that are also coupled to the insole. The compressibility adjustment process includes (i) receiving, from a respective pressure sensor associated with a respective bladder, a signal indicative of a pressure exerted on a respective portion of the foot, (ii) determining, based on the received signal, that the pressure exerted on the respective portion of the foot exceeds a threshold pressure, and (iii) responsive to determining that the pressure exerted on the respective portion of the foot exceeds the threshold pressure, adjusting the compressibility of the respective bladder, thereby offloading pressure from the respective portion of the foot to a different portion of the foot.

In some examples of the method, adjusting the compressibility of the respective bladder includes increasing the compressibility of the respective bladder, and the compressibility adjustment process further includes, responsive to determining that the pressure exerted on the respective portion of the foot exceeds the threshold pressure, decreasing or increasing the compressibility of one or more bladders different from the respective bladder.

In some examples of the method, each bladder of the plurality of bladders includes (i) a fluid having a compressibility that varies based on an electromagnetic field applied to the fluid and (ii) a controllable electromagnetic source configured to apply a variable electromagnetic field to the fluid, and adjusting the compressibility of the respective bladder includes causing the electromagnetic source of the respective bladder to adjust the electromagnetic field applied to the fluid of the respective bladder.

In some examples of the method, each bladder of the plurality of bladders includes a fluid, the compressibility of each bladder depends on an amount of the fluid in the bladder, and adjusting the compressibility of the respective bladder comprises causing a pump to pump the fluid to or from the respective bladder.

In some examples, the method further includes, prior to performing the compressibility adjustment process, adjusting the compressibility of each bladder to a baseline compressibility, where the baseline compressibility is approximately equal to a compressibility of the insole.

In some examples, the method further includes selecting a value of the threshold pressure based on (i) a user-specified value or (ii) which respective bladder of the plurality of compressible bladders the compressibility adjustment process is being performed for.

These as well as other aspects, advantages, and alternatives, will become apparent to those of ordinary skill in the art by reading the following detailed description, with reference where appropriate to the accompanying drawings.

DETAILED DESCRIPTION

Figure 1:
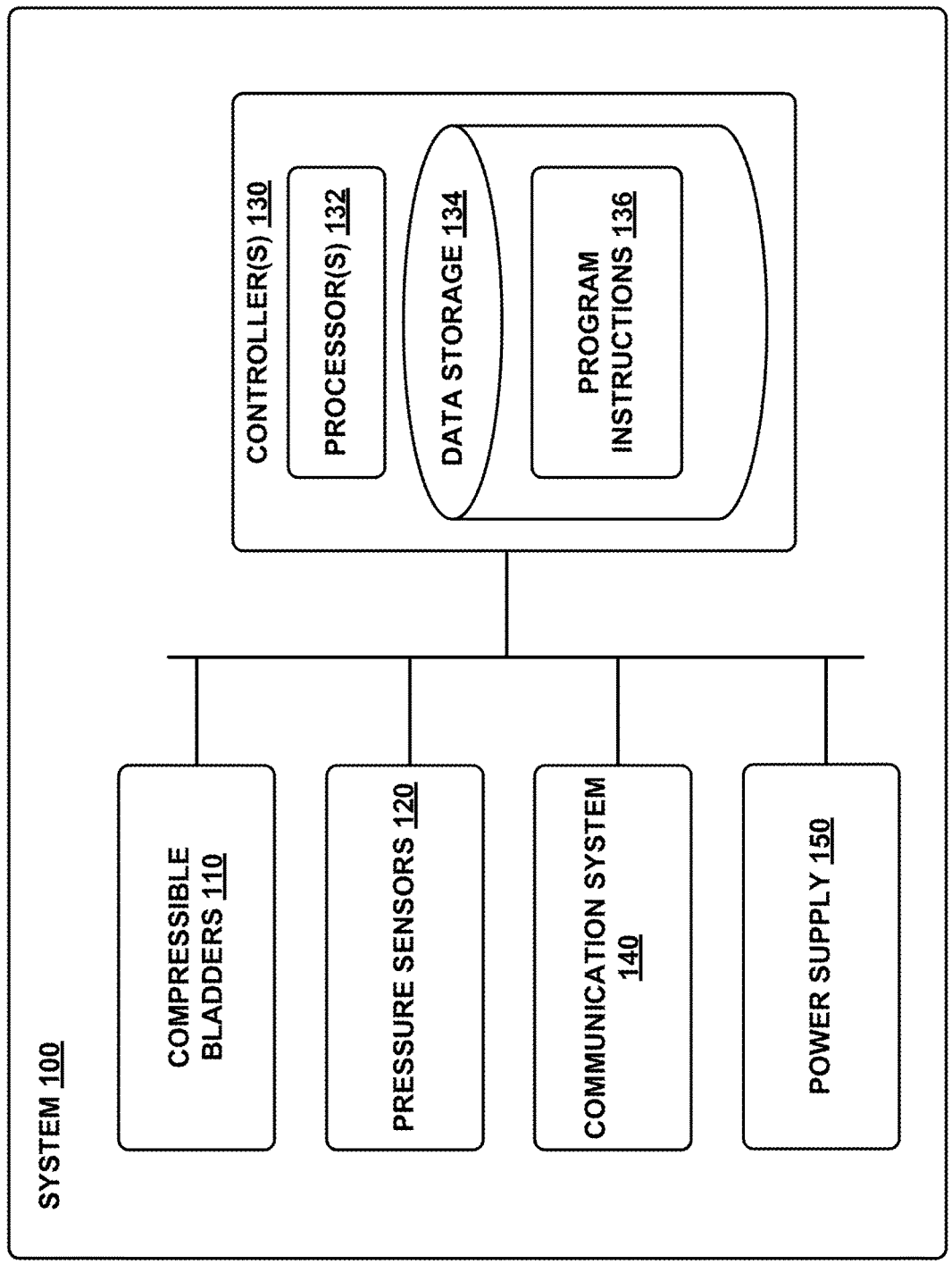
FIG. 1 is a simplified block diagram of an offloading system, according to an example embodiment.

The following detailed description describes various features and functions of the disclosed systems and methods with reference to the accompanying figures. In the figures, similar symbols typically identify similar components unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

I. OVERVIEW

When a wearer of a shoe stands, walks, jogs, runs, or the like, the shoe exerts pressure on various surfaces of the wearer's foot. Under certain circumstances, this plantar surface pressure can be uncomfortable or harmful to the wearer. For instance, if plantar surface pressure is concentrated in a localized area, the wearer's foot may experience blistering or ulceration at that area. Such a scenario could arise due to the shape of the foot, biomechanics of the wearer's gait, or when a foreign body, such as a pebble or other debris, is present in the shoe. One way to address the presence of a foreign body in the shoe is for the wearer to simply take off the shoe in order to remove the foreign body. However, this may not always be an option. For instance, the wearer may be performing a time-sensitive task or may be in an environment in which it is difficult or undesirable to take off the shoe. Further, if the wearer has peripheral neuropathy, such as due to diabetes, infection, medications, or the like, then the wearer may not even be aware that the foreign body is present in the shoe. Accordingly, it may be desirable for the shoe to automatically compensate for unwanted plantar surface loading.

Disclosed herein are examples of systems and methods for reducing unwanted plantar surface loading by offloading the pressure from high pressure areas to other areas of the foot. This is achieved by providing an insole with a number of compressible bladders having a controllable compressibility. Pressure sensors can be used to measure the pressure exerted at various locations on the wearer's foot. If a particular location experiences significantly high pressure, then the compressibility of the bladders can be adjusted to compensate for and reduce the pressure. For instance, a bladder nearest to the high pressure point can have its compressibility increased, while other bladders can have their compressibility decreased. This, in effect, softens the insole near the high pressure area and hardens the insole elsewhere, thereby offloading plantar surface pressure from the softened area to the hardened areas.

As noted above, this can be useful for addressing scenarios in which a foreign body enters the shoe to create high pressure in a concentrated area. However, the present disclosure is not limited to use in such scenarios and can be used to address any scenario in which plantar surface pressure is undesirably concentrated in a particular area. For instance, if the wearer has a foot injury, such as an ulceration, a sprain, a broken bone, or the like, then the wearer may experience pain or discomfort when pressure is applied to a plantar surface of the wearer's foot near the injury. Accordingly, examples of the present disclosure can also be used in such scenarios to offload plantar pressure away from the injury.

Further, in some examples, the compressibility of the bladders can be controlled to alter or improve a gait of the wearer and/or reduce stress on various other lower-extremity joints of the wearer. For instance, by varying the compressibility of the bladders, a trajectory of a center of pressure under the foot can also be varied. This, in turn, can affect how force is applied through the foot to one or more lower-extremity joints. Other examples are possible as well.

II. EXAMPLE OFFLOADING SYSTEMS AND DEVICES

FIG. 1 is a simplified block diagram of an offloading system 100. The system 100 can include a number of compressible bladders 110, a number of pressure sensors 120, one or more controllers 130, a communication system 140 for transmitting data between components of the system 100 and/or to another system, such as a remote server, a cloud computing system, or some other computing device, and a power supply 150.

The compressible bladders 110 can be coupled to an insole or some other portion of a shoe so that the bladders can compress underneath a wearer's foot when the wearer is wearing the shoe. Because the bladders 110 are configured to compress under a weight of the wearer, the bladders 110 can be made of any material suitable for being subjected to human weight without rupturing. Such materials can include various rubbers or plastics having an elasticity that allows the bladders 110 to substantially return to their original shape after being compressed. For example, suitable materials include, but are not limited to, polyvinyl chloride (PVC), urethane, or polyurethane, such as ninety-five Shore A durometer, ester-based polyurethane. The bladders 110 can have a controllable compressibility and may take various forms as described in further detail below.

In some examples, the bladders 110 can include a fluid that responds to electromagnetic fields, such as an electrorheological (ER) fluid or magnetorheological (MR) fluid. ER fluids and MR fluids contain electromagnetically-active particles dispersed throughout a non-conductive fluid. When an electromagnetic field (i.e., an electric field for an ER fluid and a magnetic field for an MR fluid) is applied to the fluid, the particles align with the applied field, thereby altering the fluid's behavior. Specifically, in the absence of an electromagnetic field ("off" state) the ER/MR fluid essentially behaves as a Newtonian fluid—a material in which the rate of flow is proportional to the applied stress. However, in the presence of an electromagnetic field ("on" state), the ER/MR fluid can be modeled as a Bingham plastic—a material that essentially behaves as a solid (e.g., does not flow) until the applied stress surpasses a threshold value, beyond which viscous flow occurs. As such, the resistance to motion, and thus the compressibility, of the ER/MR fluid can be controlled by varying the intensity of the electromagnetic field applied to the fluid. Examples of ER fluids that can be used in the bladders 110 include, but are not limited to, those discussed in U.S. Pat. No. 6,852,251, which is hereby incorporated by reference in its entirety. Examples of MR fluids that can be used in the bladders 110 include, but are not limited to, those discussed in U.S. Pat. No. 5,906,767, which is hereby incorporated by reference in its entirety. However, other examples of ER and MR fluids are possible as well.

In other examples, the compressibility of the bladders 110 can be controlled by varying an amount of fluid in the bladders 110. For instance, the system 100 can further include a pump configured to pump fluid to and/or from each bladder. As such, the pump could reduce the compressibility of a bladder by pumping additional fluid into the bladder, and the pump could increase the compressibility of the bladder by allowing the fluid to flow out of the bladder or by actively pumping the fluid out of the bladder. As used in this context, the term "fluid" refers to a substance that has no fixed shape and is able to flow, such as a liquid (e.g., water) or gas (e.g., air).

As noted above, the system 100 further includes pressure sensors 120. The pressure sensors 120 can also be coupled to the insole and can be configured to measure pressures exerted at various locations on the wearer's foot. For instance, when subjected to an external force, the pressure sensors 120 can output an electrical signal. Characteristics of the signal, such as a magnitude of voltage or current, may depend on the magnitude of the external force. As such, the electrical signals output by the pressure sensors 120 can be processed to determine how much pressure is applied to the wearer's foot at each sensor. Examples of pressure sensors 120 include, but are not limited to, capacitive sensors, piezoelectric sensors, or potentiometric sensors.

As further noted above, the system 100 includes one or more controllers 130. The controller(s) 130 include one or more processors 132, which can include or take the form of a central processing unit (CPU), such as one or more general purpose processors and/or one or more dedicated processors (e.g., application specific integrated circuits (ASICs) or digital signal processors (DSPs), etc.). The controller(s) 130 further include data storage 134, which can include or take the form of one or more non-transitory computer-readable storage media that can be read or accessed by the processor(s) 132. The one or more computer-readable storage media can include volatile and/or non-volatile storage components, such as optical, magnetic, organic, or other memory or disc storage. In some examples, the data storage 134 can be implemented using a single physical device (e.g., one optical, magnetic, organic, or other memory or disc storage unit), while in other examples, the data storage 134 can be implemented using two or more physical devices.

The processor(s) 132 can be configured to execute computer-readable program instructions 136 that are stored in the data storage 134 and are executable to provide some or all of the functionality described herein. For instance, the processor(s) 132 can execute the computer-readable program instructions 136 to operate the compressible bladders 110 (e.g., by controlling a compressibility of the bladders) and the pressure sensors 120 (e.g., by determining the pressure measured by the pressure sensors 120), as described in further detail below.

The communication system 140 can include one or more wired or wireless interfaces for communicating data between various components of the system 100 and/or for communicating with one or more other computing systems. For instance, the communication system 140 can include one or more antennas for transmitting and/or receiving an electromagnetic or other wireless signal according to one or more wireless communications standards (e.g., Bluetooth, WiFi, IRdA, ZigBee, WiMAX, or LTE). Additionally or alternatively, the communication system 140 can include one or more wired communications interfaces for sending and/or receiving signals according to one or more wired communications standards (e.g., USB, FireWire, Ethernet, or RS-232).

In practice, the controller(s) 130 can communicate via the communication system 140 with the pressure sensors 120 to receive electrical signals that the pressure sensors 120 generate in response to pressure being exerted on a wearer's foot. The controller(s) 130 can perform operations on the received signals to determine the extent of the pressure exerted on the wearer's foot at each sensor. Based on the determined extent of pressure, the controller(s) 130 can communicate with the bladders 110 via the communication system 140 to control the compressibility of one or more of the bladders 110, as described in more detail below.

Further, the controller(s) 130 can communicate via the communication system 140 to provide an output of the determined pressures exerted on the wearer's foot. For instance, the controller(s) 130 can use the communication system 140 to send information related to the determined plantar pressure information over a communication network, such as the Internet, to an external computing system, such as a mobile computing device, a cloud computing system, and/or a remote server. The external computing system can include a user interface, such as a display screen, for displaying the plantar pressure information to the wearer or to a medical professional.

The power supply 150 can include one or more batteries for providing power to the system 100. In some examples, the one or more batteries can be rechargeable, and each battery can be recharged through a wired connection between the battery and an external power supply and/or through a wireless charging system, such as an inductive charging system that applies an external time-varying magnetic field to an internal battery. Other examples are possible as well.

Figure 2A:
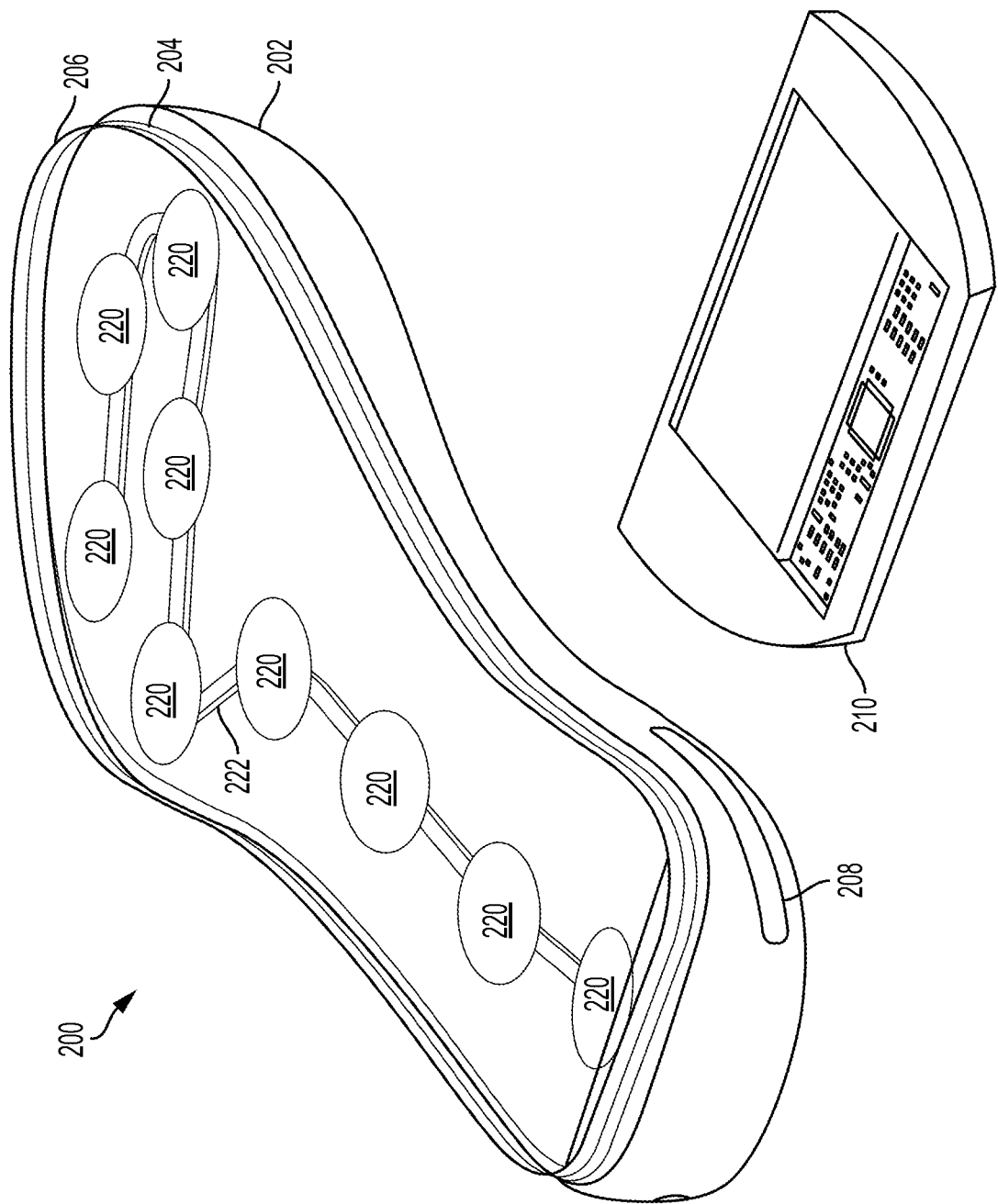
FIG. 2A illustrates an offloading system, according to an example embodiment.

FIG. 2A illustrates an example insole 200 for offloading plantar surface pressure from one area of a wearer's foot to another area. The insole 200 can be a removable insert capable of being used with any number of different types of shoes, or the insole 200 can be fabricated as a non-removable part of a shoe. The insole 200 includes a bottom layer 202, an intermediate layer 204, and a top layer 206. Each of the bottom layer 202, intermediate layer 204, and top layer 206 can include insole materials that can be found in conventional shoe inserts, such as fabric, foam, gel, or the like. Further, each layer can be fabricated independently and then joined together, or the layers can be fabricated together as part of a single insole system.

The bottom layer 202 of the insole 200 is configured to interface with a shoe and can include a slot 208 for receiving and housing a control system 210. In some examples, the slot 208 and control system 210 can be arranged in other portions of the insole 200, such as in the intermediate layer 204 or the top layer 206. The control system 210 can be configured to carry out the operations described herein, and so the control system 210 can include the controller(s) 130, elements of the communication system 140, the power supply 150, and/or various other elements of the system 100, such as a pump for adjusting an amount of fluid in the compressible bladders.

The intermediate layer 204 sits on top of the bottom layer 202 and includes a number of compressible bladders 220 connected together by a number of links 222. The links 222 can include electrical conductors and/or a conduit through which fluid can flow. For instance, in examples where the bladders 220 include ER fluid or MR fluid, the links 222 can include electrical conductors coupled to the control system 210, and the control system 210 can send signals to the bladders 220 that control an electromagnetic field applied to the ER fluid or MR fluid. In examples where a pump controls an amount of fluid in each bladder 220, the links 222 can include a conduit that connects each bladder 220 to the pump so that the pump can increase or decrease the amount of fluid in each bladder.

The bladders 220 and links 222 can be included in the intermediate layer 204 in various ways. For instance, portions of the intermediate layer 204 can be hollowed out to accommodate insertion of the bladders 220 and links 222 into the intermediate layer 204. Alternatively, the bladders 220 and links 222 can be embedded in the intermediate layer 204 by fabricating the intermediate layer 204 around the bladders 220 and links 222 or by forming the bladders 220 and links 222 as part of the intermediate layer 204 during fabrication. Other examples are possible as well.

Further, while the insole 200 depicts a particular number of bladders 220 arranged in a particular pattern, other examples can include additional or fewer bladders 220 arranged in a different pattern. For instance, in some examples, the bladders 220 may be arranged in a pattern that aligns the bladders 220 with certain pressure points of a foot. Specifically, at least some of the bladders 220 can be aligned with the heads of the metatarsal bones and/or with the heel of the foot. Other examples are possible as well.

The top layer 206 sits on top of the intermediate layer 204 and includes a number of pressure sensors (not shown). The top layer 206 is configured to interface with a wearer's foot, such that the pressure sensors in the top layer are configured to measure pressure exerted at various plantar surfaces of the foot. The pressure sensors can be distributed throughout the top layer 206 in various patterns. For instance, in some examples, the top layer 206 can include a single pressure sensor aligned with each compressible bladder 220. In other examples, the top layer 206 can include multiple pressure sensors arranged in proximity to each compressible bladder 220. In any case, the pressure sensors of the top layer 206 can be electrically coupled to the control system 210, such as through the links 222, so that the control system 210 can receive pressure measurements from the pressure sensors.

Figure 2B:
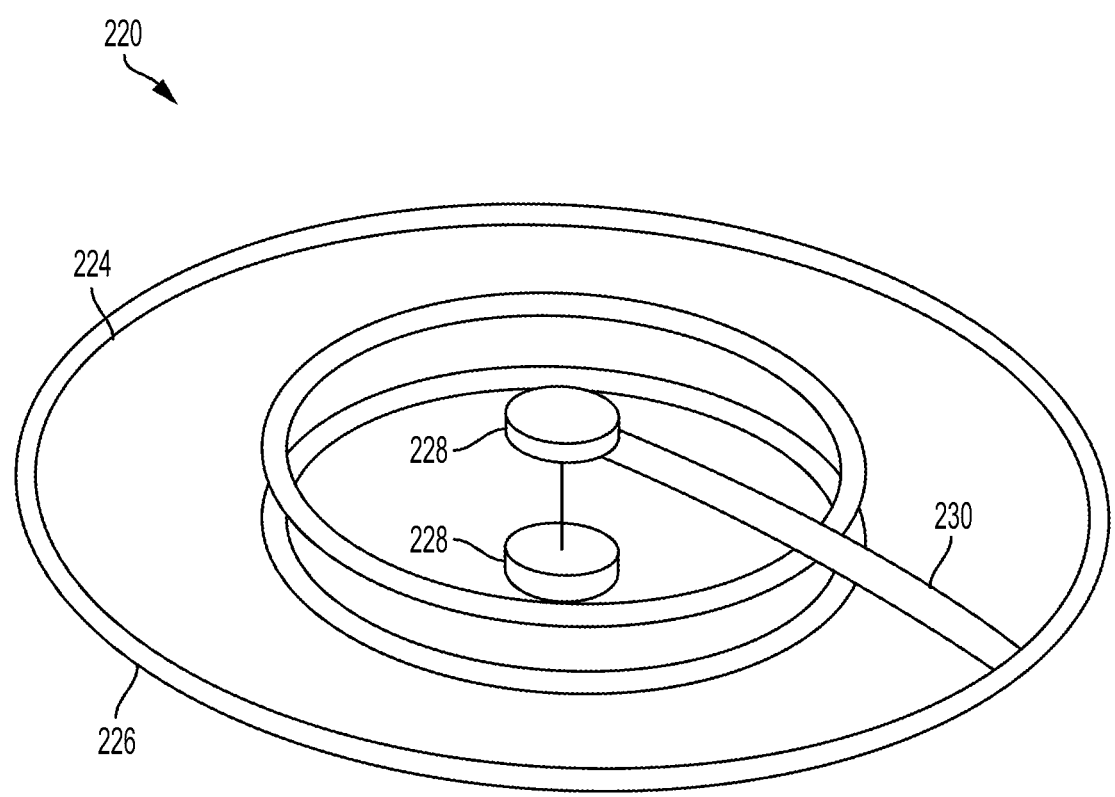
FIG. 2B illustrates a compressible bladder for use in the offloading system shown in FIG. 2A, according to an example embodiment.

FIG. 2B illustrates an example compressible bladder 220 for use in the insole 200. The bladder 220 includes a top disc 224 joined with a bottom disc 226 to form a circular pouch. The bladder 220 can be filled with ER fluid or MR fluid, and the bladder 220 can include electrodes 228 for applying an electromagnetic field to the ER fluid or MR fluid. For instance, the electrodes 228 can be coupled to the links 222 by a conductor 230, such that the control system 210 can adjust the electromagnetic field applied to the ER fluid or MR fluid by sending a control signal through the links 222 and the conductor 230 to the electrodes 228. In examples where the fluid in the bladder 220 is an ER fluid, the electrodes 228 can act as capacitive plates, and the control system 210 can adjust the electromagnetic field applied to the ER fluid by adjusting a voltage applied to the capacitive plates. In examples where the fluid in the bladder 220 is an MR fluid, the electrodes 228 can include a controllable electromagnetic source like an electromagnet, and the control system 210 can adjust the electromagnetic field applied to the MR fluid by adjusting a voltage applied to the electromagnet. Other examples are possible as well.

Figure 3A:
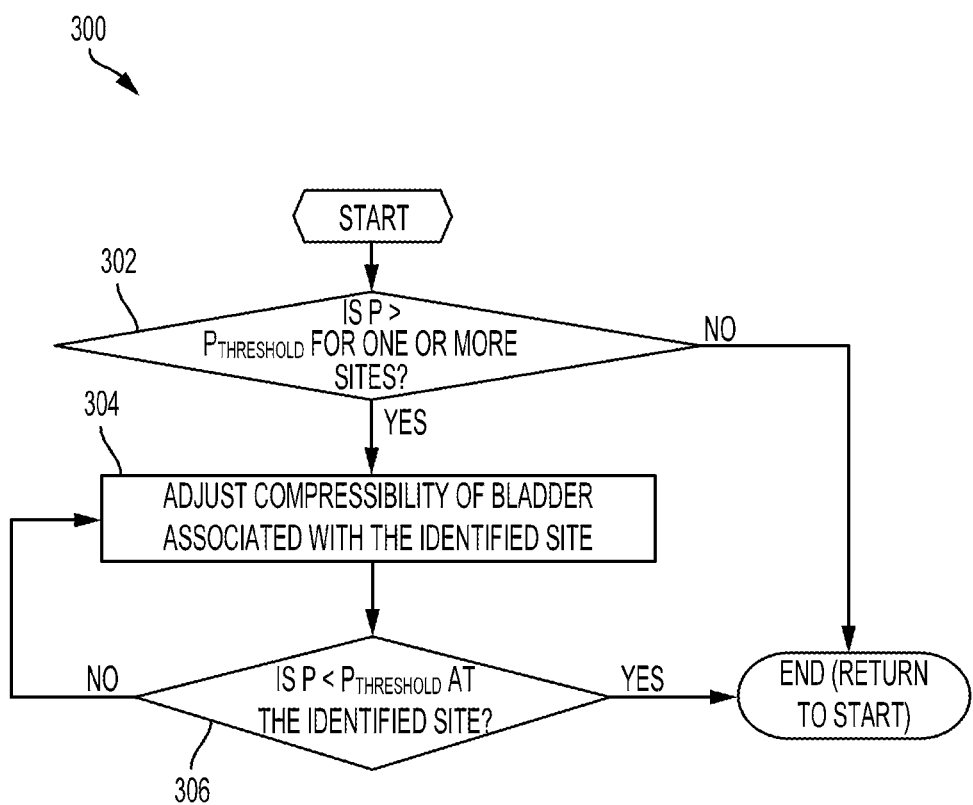
FIG. 3A is a flow chart of an algorithm for adjusting the compressibility of a compressible bladder, according to an example embodiment.

FIG. 3A is a flow chart of an example algorithm 300 that the control system 210 can use to adjust the compressibility of each bladder 220 of the insole 200. The example algorithm 300 is shown for illustrative purposes and is not meant to be limiting. Alternative examples can include other algorithms for adjusting the compressibilities of the bladders 220 in various manners.

The example algorithm 300 starts at step 302, where the control system 210 determines whether a pressure measured at any of the pressure sensors exceeds a threshold pressure. An example threshold pressure is 200 kPa, as higher pressures have been shown to increase the risk of ulceration in diabetic patients with peripheral neuropathy, but other threshold pressures can be selected as well. The threshold pressure can be a fixed value that is the same for all pressure sensors, or the threshold pressure can vary depending on the location of the pressure sensor relative to the foot, as certain plantar surfaces may be more sensitive than others. Further, in some examples, the wearer can specify the threshold pressure for the pressure sensors, individually or as a set.

When measuring the pressure at each pressure sensor, the measurements can be averaged over time to obtain more accurate measurements. For instance, the control system 210 can measure the average pressure at a pressure sensor over the course of a fixed number of steps, such as twenty steps. As such, the control system 210 can further include a motion sensor, such as an accelerometer, for detecting when the wearer takes a step.

In any case, if the control system 210 determines that none of the pressure sensors are detecting a pressure exerted on the foot that exceeds the threshold pressure, then the algorithm ends and returns to the start to execute another loop. However, if the control system 210 determines that a pressure sensor detects a pressure exerted on the foot that exceeds the threshold pressure, then the algorithm advances to step 304.

At step 304, the control system 210 adjusts the compressibility of the bladder that is associated with the identified pressure sensor that is detecting pressure above the threshold pressure. In line with the discussion above, the control system 210 can adjust the compressibility of the bladder in various ways. For instance, if the bladder includes an ER fluid or an MR fluid, then the control system 210 can adjust the compressibility of the bladder by increasing or decreasing the strength of an electromagnetic field applied to the ER fluid or MR fluid. Specifically, increasing the strength of the electromagnetic field causes the ER fluid or MR fluid to behave more like a solid and become less compressible, while decreasing the strength of the electromagnetic field causes the ER fluid or MR fluid to behave more like a liquid and become more compressible. Alternatively, if the compressibility of the bladder is characterized by an amount of pressurized fluid present in the bladder, then the control system 210 can adjust the compressibility of the bladder by pumping additional fluid into the bladder to reduce the compressibility or by releasing fluid from the bladder to increase the compressibility.

In any case, in order to attempt to reduce the pressure at the identified site to a pressure below the threshold pressure, the control system 210 can increase the compressibility of the bladder associated with the identified pressure sensor. As such, if the bladder contains ER fluid or MR fluid, then the control system 210 can increase the compressibility of the bladder by reducing the strength of the electromagnetic field applied to the bladder, and if the compressibility of the bladder is based on an amount of fluid in the bladder, then the control system 210 can increase the compressibility of the bladder by causing some of the fluid to leave the bladder.

After adjusting the compressibility of the bladder associated with the identified pressure sensor that is detecting pressure above the threshold pressure, the algorithm advances to step 306. At step 306, the control system 210 determines whether the adjustment to the compressibility of the bladder caused the pressure measured by the identified pressure sensor to fall below the threshold pressure. If the pressure at the pressure sensor still exceeds the threshold pressure, then the algorithm returns to step 304 to further adjust the compressibility of the bladder associated with the pressure sensor. However, if the pressure has fallen below the threshold pressure, then the algorithm ends and returns to the start to execute another loop.

Figure 3B:
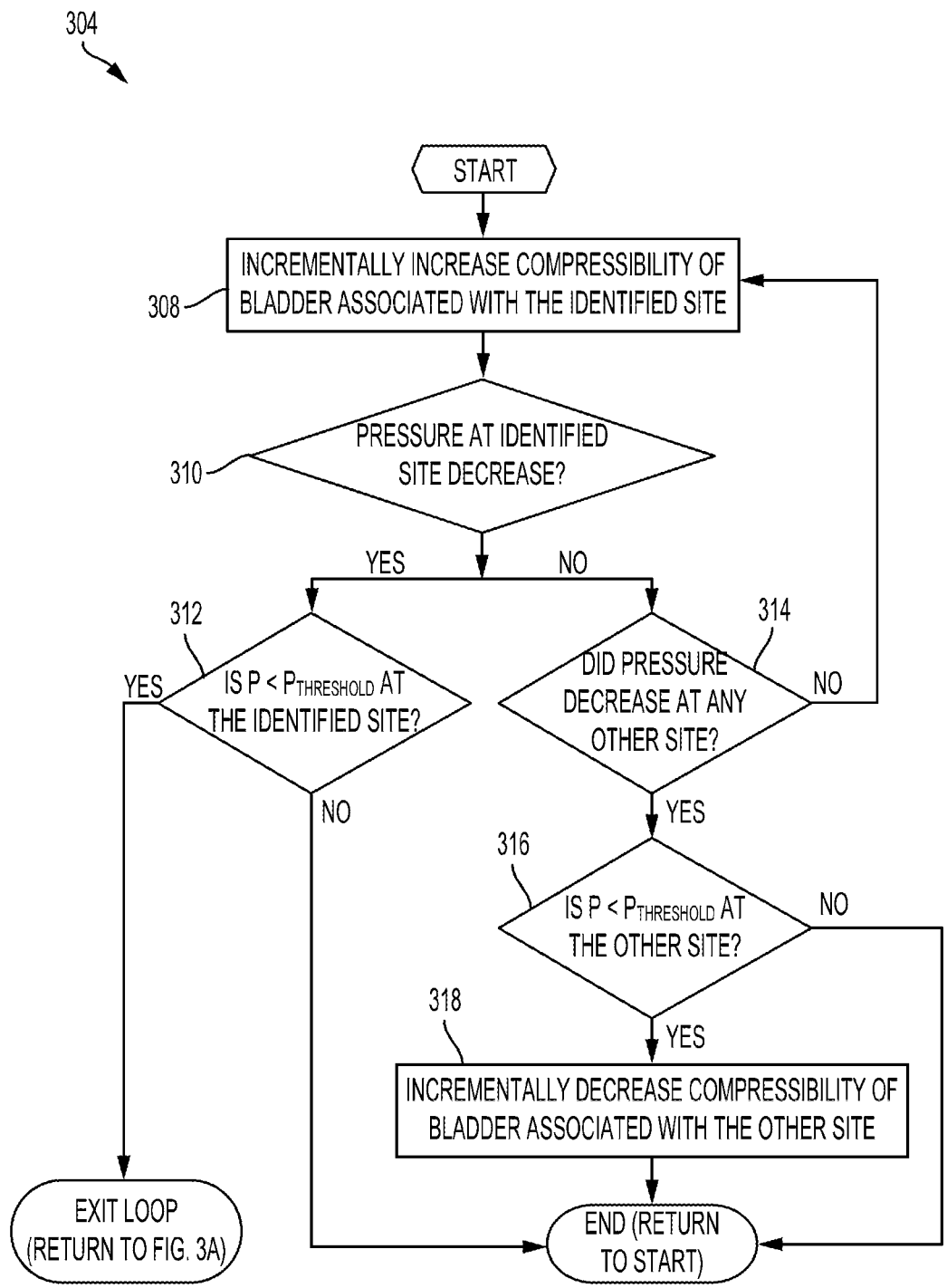
FIG. 3B is a flow chart of another algorithm for adjusting the compressibility of a compressible bladder, according to an example embodiment.

FIG. 3B is a flow chart of an algorithm for performing the compressibility adjustment at step 304 in FIG. 3A. The compressibility adjustment algorithm 304 starts at step 308, where the control system 210 incrementally increases the compressibility of the bladder associated with the identified pressure sensor. As noted above, the control system 210 can increase the compressibility of the bladder in various ways, such as by reducing the strength of the applied electromagnetic field or by releasing fluid from the bladder, depending on the type of bladder. The control system 210 can increase the compressibility by a predetermined increment. For example, the control system 210 can reduce the strength of the applied electromagnetic field by a predetermined amount (e.g., 5%), or the control system 210 can release a predetermined volume of fluid from the bladder. In some examples, these incremental adjustments can be fixed values or they can be proportional to how much the measured pressure exceeds the threshold pressure.

After incrementally increasing the compressibility of the bladder, the algorithm 304 advances to step 310 where the control system determines whether the pressure at the identified pressure sensor has decreased. If the pressure has decreased, then the algorithm 304 advances to step 312 where the control system 210 determines whether the pressure at the identified pressure sensor has decreased below the threshold pressure. If so, then the compressibility adjustment algorithm 304 is exited, and the control system 210 can resume carrying out the algorithm 300 in FIG. 3A. If, however, the pressure at the identified pressure sensor has not fallen below the threshold pressure, then the compressibility adjustment algorithm 304 returns to step 308 to execute another loop.

Returning back to the determination at step 310, if the control system 210 determines that the pressure at the identified pressure sensor did not decrease after incrementally increasing the compressibility of the bladder, then the algorithm 304 advances to step 314. At step 314, the control system 210 determines whether incrementally increasing the compressibility of the bladder caused the pressure at any other pressure sensor to decrease. If not, then the algorithm 304 returns to step 308 to execute another loop. However, if incrementally increasing the compressibility of the bladder caused the pressure at another pressure sensor to decrease, then the algorithm 304 advances to step 316.

At step 316, the control system 310 identifies the other pressure sensor where the pressure decreased and determines whether the pressure at that other pressure sensor is below a secondary threshold pressure. The secondary threshold pressure can have a value that is lower than the threshold pressure, such as 75% of the threshold pressure. If the pressure at the other pressure sensor is not below the secondary threshold pressure, then the algorithm 304 returns to step 308 to execute another loop. However, if the pressure at the other pressure sensor is below the secondary threshold pressure, then the algorithm 304 advances to step 318.

At step 318, the control system 210 incrementally decreases the compressibility of the bladder associated with the other pressure sensor that experienced a decrease in pressure. As noted above, the control system 210 can decrease the compressibility of the bladder in various ways, such as by increasing the strength of the applied electromagnetic field or by pumping fluid into the bladder, depending on the type of bladder. The control system 210 can decrease the compressibility by a predetermined increment. For example, the control system 210 can increase the strength of the applied electromagnetic field by a predetermined amount (e.g., 5%), or the control system 210 can cause a predetermined volume of fluid to be pumped into the bladder. Decreasing the compressibility of the bladder associated with the other pressure sensor that experienced a pressure decrease can counteract the decrease in pressure at that other pressure sensor. After incrementally decreasing the compressibility of the bladder associated with the other pressure sensor that experienced a decrease in pressure, the algorithm 304 returns to step 308 to execute another loop.

In some examples, the algorithm 300 can include steps for making alternative or additional adjustments when a bladder has its compressibility increased to a threshold high compressibility or decreased to a threshold low compressibility. For instance, in some scenarios, performance of the example algorithm 300 can result in a bladder reaching a maximum compressibility, such as by reducing an electromagnetic field applied to the ER/MR fluid to zero or by allowing a pressurized fluid to completely evacuate the bladder. In other scenarios, performance of the example algorithm 300 can result in a bladder reaching a minimum compressibility, such as by saturating the ER/MR fluid with the applied electromagnetic field or by pumping a maximum amount of pressurized fluid into the bladder. In such scenarios, it can be futile to attempt to further increase or decrease the compressibility of the bladder. Instead, the algorithm 300 can include adjusting the compressibility of other bladders associated with pressure sensors that are presently below the threshold pressure in order to offload pressure from any bladder associated with a pressure sensor that is above the threshold pressure. For instance, one or more bladders near the high pressure sensor can have their compressibilities increased, while other bladders, such as those surrounding the high pressure sensor can have their compressibility decreased. This, in effect, softens the insole near the high pressure area and hardens the insole elsewhere, thereby offloading plantar surface pressure from the softened area to the hardened areas.

In some examples, the algorithm 300 depicted in FIGS. 3A and 3B can be carried out concurrently for all pressure sensors and compressible bladders 220, such that the control system 210 can concurrently adjust the compressibility of multiple bladders 220 at the same time. In other examples, the algorithm 300 can be carried out sequentially for each pressure sensor and bladder 220, such as in a fixed order or in order of highest-to-lowest detected pressure.

In some examples, prior to carrying out the algorithm 300 to adjust the compressibilities of the bladders 220, the control system 210 can set the compressibilities of the bladders 220 to a baseline compressibility. The baseline compressibility can be selected such that the baseline compressibility is approximately equal to the compressibility of the portions of the insole that surround the bladders 220.

Figure 4:
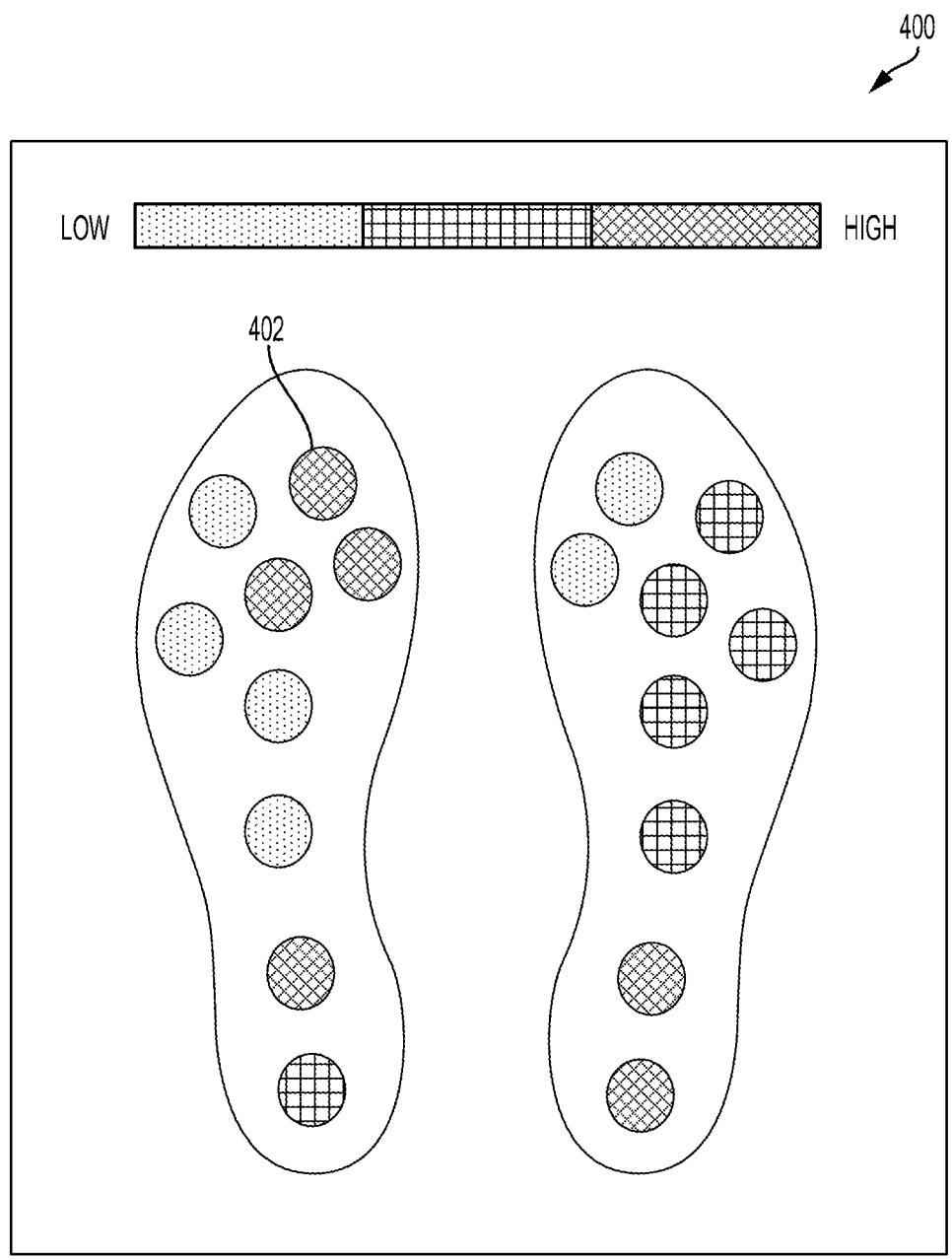
FIG. 4 illustrates a user interface of an offloading system, according to an example embodiment.

FIG. 4 illustrates an example user interface 400 for use with the insole system 200 described above. The user interface 400 can be displayed on a display of a computing device, such as a smartphone, tablet, or personal computer, that is in communication with the insole system 200. The computing device can receive data indicative of pressures detected by the pressure sensors and can display indications of the detected pressures through the user interface 400. In this manner, the user interface 400 can present information to a "user," such as the wearer of the insole system 200, or to another relevant party, such as a medical professional.

As shown, the user interface 400 can include icons 402 corresponding to the various compressible bladders 220 in the insole device 200. The icons 402 can provide an indication of the pressures sensed by pressure sensors associated with each of the bladders 220. For instance, an icon 402 can display a first visual indication if the corresponding bladder 220 is associated with a pressure sensor measuring a low pressure, a second visual indication if the corresponding bladder 220 is associated with a pressure sensor measuring a middle pressure, and a third visual indication if the corresponding bladder 220 is associated with a pressure sensor measuring a high pressure. Other examples are possible as well.

Further, the user interface 400 can be configured to allow for user input. For instance, a user can select one of the icons 402, such as by clicking a mouse or touching a touch screen, to obtain more information about the bladder 220 corresponding to the selected icon 402. For instance, upon selecting an icon 402, the user interface 400 can display specific pressure values measured by pressure sensors associated with the bladder 220 corresponding to the selected icon 402. Further, the user interface 400 can prompt the user to input calibration information related to the bladder 220 corresponding to the selected icon 402. In this manner, the user can specify the threshold pressure for each bladder 220. The computing device can then transmit the user-specified threshold pressure to the insole system 200. Other examples are possible as well.

Figure 5:
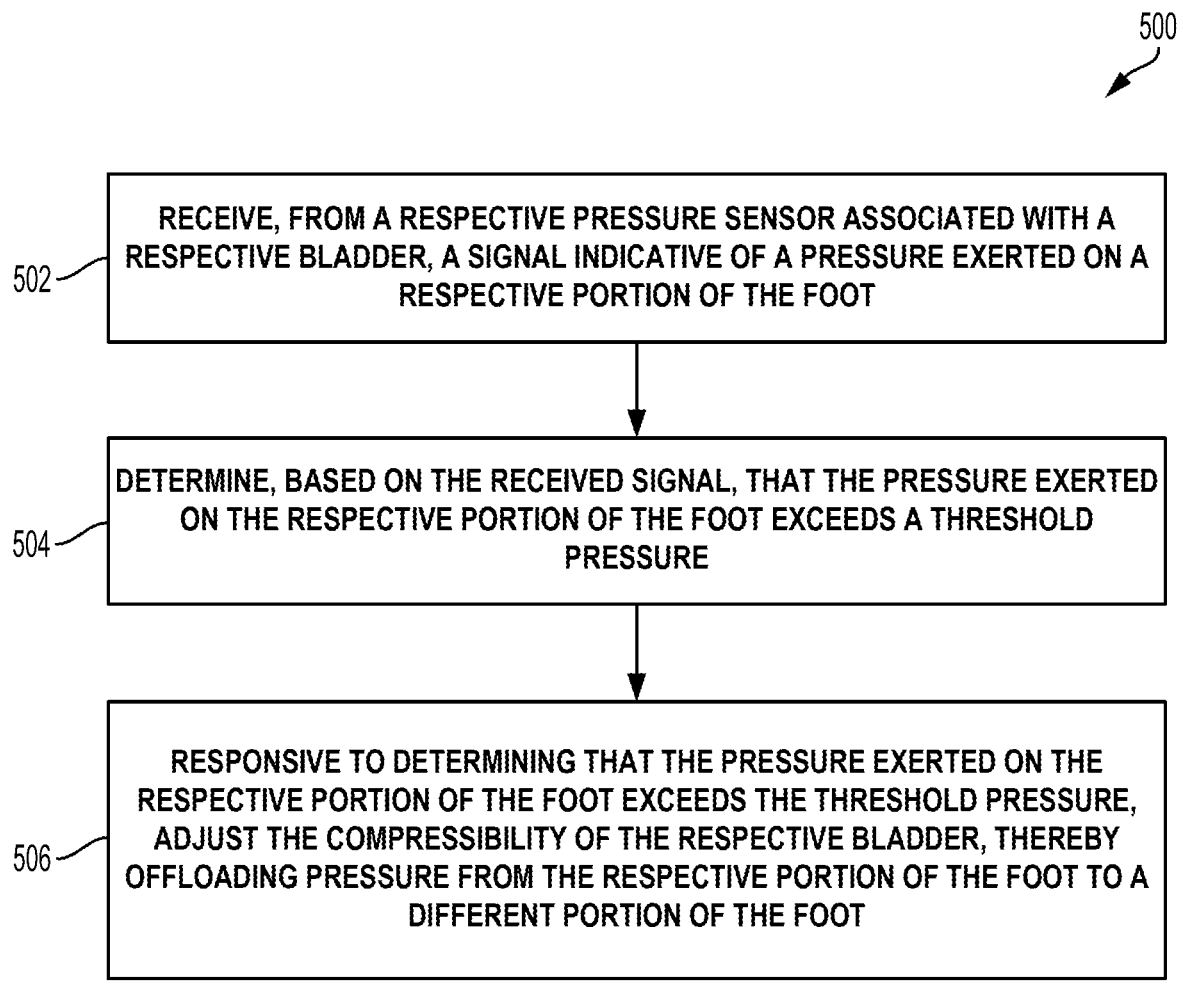
FIG. 5 is a flow chart of a method, according to an example embodiment.

FIG. 5 is a flow chart of an example method 500 that can be carried out in accordance with the present disclosure to offload pressure from one area of a plantar surface to another area of the plantar surface. The method 500 involves performing a compressibility adjustment process for each bladder of a number of compressible bladders, where the compressible bladders are coupled to an insole that is capable of interfacing with a foot, where each bladder has an adjustable compressibility, and where each bladder is associated with a respective pressure sensor of a number of pressure sensors that are coupled to the insole.

At block 502, the method 500 includes receiving, from a respective pressure sensor associated with a respective bladder, a signal indicative of a pressure exerted on the respective portion of the foot. And at block 504, the method 500 includes determining, based on the received signal, that the pressure exerted on the respective portion of the foot exceeds a threshold pressure. In line with the discussion above, the threshold pressure can be a fixed value or it can vary for each pressure sensor and compressible bladder. Further in line with the discussion above, the threshold pressure can be specified based on a user input.

At block 506, the method 500 includes, responsive to determining that the pressure exerted on the respective portion of the foot exceeds the threshold pressure, adjusting the compressibility of the respective bladder, thereby offloading pressure from the respective portion of the foot to a different portion of the foot. In line with the discussion above, adjusting the compressibility of the respective bladder can be done in various ways. For instance, the compressibility of the respective bladder can be adjusted according to the algorithms discussed above with respect to FIGS. 3A and 3B.

Accordingly, in some examples, adjusting the compressibility of the respective bladder includes increasing the compressibility of the respective bladder, and the method 500 can further include, responsive to determining that the pressure exerted on the respective portion of the foot exceeds the threshold pressure, increasing or decreasing the compressibility of one or more bladders different from the respective bladder. For example, to reduce the pressure at one respective region of the foot below the threshold pressure, it may be necessary to increase compressibility at an adjacent site's corresponding bladder and to decrease compressibility at a tertiary bladder.

In some examples, the method 500 can further involve, after adjusting the compressibility of the respective bladder, receiving, from the respective pressure sensor associated with the respective bladder, a subsequent signal indicative of the pressure exerted on the respective portion of the foot. The method 500 can further involve determining, based on the subsequent signal, that the pressure exerted on the respective portion of the foot does not exceed the threshold pressure and, responsive to determining that the pressure exerted on the respective portion of the foot does not exceed the threshold pressure, maintaining the compressibility of the respective bladder.

In some examples, the method 500 can involve, prior to performing the compressibility adjustment process for each bladder of the plurality of bladders, adjusting the compressibility of each bladder to a baseline compressibility. In line with the discussion above, the baseline compressibility can be a compressibility that is approximately equal to a compressibility of the insole.

Further, the method 500 can include additional or alternative steps. In some examples, the method 500 can include providing, to the wearer, an indication of the pressures exerted on the foot. For instance, the method 500 can include displaying a graphical or textual representation of the pressure information. As another example, the method 500 can include selecting a value for the threshold pressure associated with each pressure sensor and/or bladder. For instance, the threshold pressure associated with each pressure sensor and/or bladder can be selected based on a user input, such as a value specified by the wearer or by a medical professional. The value can be specified, for instance, by inputting a threshold pressure into a user interface of an external computing device, such as a smartphone, tablet, or personal computer. In some examples, the threshold pressure associated with each pressure sensor and/or bladder can vary based on a position of the pressure sensor and/or bladder. For instance, pressure sensors and/or bladders located near a heel portion of the insole can have a higher threshold pressure than pressure sensors and/or bladders located near an arch portion of the insole. Other examples are possible as well.

III. CONCLUSION

The particular arrangements shown in the figures should not be viewed as limiting. It should be understood that other embodiments may include more or less of each element shown in a given figure. Further, some of the illustrated elements may be combined or omitted. Yet further, an exemplary embodiment may include elements that are not illustrated in the figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
    an insole capable of coupling with a shoe and interfacing with a foot;
    a plurality of bladders coupled to the insole, wherein each bladder of the plurality of bladders has an adjustable compressibility;
    a plurality of pressure sensors coupled to the insole, wherein each pressure sensor of the plurality of pressure sensors is configured to measure a pressure exerted on a respective portion of the foot, and wherein each pressure sensor of the plurality of pressure sensors is associated with a respective bladder of the plurality of bladders; and
    a controller configured to perform a compressibility adjustment process for each bladder of the plurality of bladders, the compressibility adjustment process comprising:
        receiving, from a respective pressure sensor associated with a respective bladder, a signal indicative of a pressure exerted on a respective portion of the foot;
        determining, based on the received signal, that the pressure exerted on the respective portion of the foot exceeds a threshold pressure; and
        responsive to determining that the pressure exerted on the respective portion of the foot exceeds the threshold pressure, (i) incrementally increasing the compressibility of the respective bladder in predetermined increments and (ii) incrementally decreasing the compressibility of one or more bladders different from the respective bladder in predetermined increments, thereby offloading pressure from the respective portion of the foot to a different portion of the foot.

2. The system of claim 1, wherein each bladder of the plurality of bladders includes (i) a fluid having a compressibility that varies based on an electromagnetic field applied to the fluid and (ii) a controllable electromagnetic source configured to apply a variable electromagnetic field to the fluid, wherein increasing the compressibility of the respective bladder comprises causing the electromagnetic source of the respective bladder to adjust the electromagnetic field applied to the fluid of the respective bladder, and wherein decreasing the compressibility of the one or more bladders different from the respective bladder comprises causing the electromagnetic source of the one or more bladders different from the respective bladder to adjust the electromagnetic field applied to the fluid of the one or more bladders different from the respective bladder.

3. The system of claim 1, wherein each bladder of the plurality of bladders includes a fluid, wherein the compressibility of each bladder depends on an amount of the fluid in the bladder, wherein the system further comprises a pump configured to pump the fluid to or from each bladder, wherein increasing the compressibility of the respective bladder comprises causing the pump to pump the fluid from the respective bladder, and wherein decreasing the compressibility of the one or more bladders different from the respective bladder comprises causing the pump to pump the fluid to the one or more bladders different from the respective bladder.

4. The system of claim 1, wherein the controller is configured to perform the compressibility adjustment process sequentially for each bladder of the plurality of bladders.

5. The system of claim 1, wherein the controller is configured to perform the compressibility adjustment process concurrently for all bladders of the plurality of bladders.

6. The system of claim 1, wherein the controller is configured to, prior to performing the compressibility adjustment process for each bladder of the plurality of bladders, adjust the compressibility of each bladder to a baseline compressibility.

7. The system of claim 6, wherein the baseline compressibility is approximately equal to a compressibility of the insole.

8. The system of claim 1, wherein the compressibility adjustment process further comprises:
after increasing the compressibility of the respective bladder and decreasing the compressibility of the one or more bladders different from the respective bladder, receiving, from the respective pressure sensor associated with the respective bladder, a subsequent signal indicative of the pressure exerted on the respective portion of the foot;
determining, based on the subsequent signal, that the pressure exerted on the respective portion of the foot does not exceed the threshold pressure; and
responsive to determining that the pressure exerted on the respective portion of the foot does not exceed the threshold pressure, maintaining the compressibilities of the respective bladder and the one or more bladders different from the respective bladder.

9. The system of claim 1, wherein the threshold pressure is a first threshold pressure, and wherein (i) incrementally increasing the compressibility of the respective bladder in predetermined increments and (ii) incrementally decreasing the compressibility of the one or more bladders different from the respective bladder in predetermined increments comprises:
increasing the compressibility of the respective bladder by a first predetermined increment;
receiving, from a second respective pressure sensor associated with the one or more bladders different from the respective bladder, a second signal indicative of a second pressure exerted on a second respective portion of the foot;
determining, based on the second signal, that the pressure exerted on the second respective portion of the foot is below a second threshold pressure; and
responsive to determining that the pressure exerted on the second respective portion of the foot is below the second threshold pressure, decreasing the compressibility of the one or more bladders different from the respective bladder by a second predetermined increment.

10. The system of claim 1, wherein performing the compressibility adjustment process for each bladder of the plurality of bladders adjusts a center of pressure under the foot, thereby affecting how force is applied through the foot to one or more lower-extremity joints.

11. The system of claim 1, wherein the controller is configured to receive one or more signals from an external computing device specifying a value of the threshold pressure.

12. The system of claim 1, wherein the compressibility adjustment process further comprises determining a value of the threshold pressure, wherein the determined value depends on which respective bladder of the plurality of bladders the controller performs the compressibility adjustment process for.

13. A system comprising:
a shoe configured to be worn on a foot;
a plurality of bladders coupled to the shoe, wherein each bladder of the plurality of bladders has an adjustable compressibility;
a plurality of pressure sensors coupled to the shoe, wherein each pressure sensor of the plurality of pressure sensors is configured to measure a pressure exerted on a respective portion of the foot, and wherein each pressure sensor of the plurality of pressure sensors is associated with a respective bladder of the plurality of bladders; and
a controller configured to perform a compressibility adjustment process for each bladder of the plurality of bladders, the compressibility adjustment process comprising:
receiving, from a respective pressure sensor associated with a respective bladder, a signal indicative of a pressure exerted on a respective portion of the foot;
determining, based on the received signal, that the pressure exerted on the respective portion of the foot exceeds a threshold pressure; and
responsive to determining that the pressure exerted on the respective portion of the foot exceeds the threshold pressure, (i) incrementally increasing the compressibility of the respective bladder in predetermined increments and (ii) incrementally decreasing the compressibility of one or more bladders different from the respective bladder in predetermined increments, thereby offloading pressure from the respective portion of the foot to a different portion of the foot.

14. A method comprising:
performing, for each bladder of a plurality of compressible bladders, a compressibility adjustment process, wherein the plurality of compressible bladders are coupled to an insole that is capable of interfacing with a foot, wherein each bladder of the plurality of compressible bladders has an adjustable compressibility, wherein each bladder of the plurality of compressible bladders is associated with a respective pressure sensor of a plurality of pressure sensors that are coupled to the insole, and wherein the compressibility adjustment process comprises:
receiving, from a respective pressure sensor associated with a respective bladder, a signal indicative of a pressure exerted on a respective portion of the foot;
determining, based on the received signal, that the pressure exerted on the respective portion of the foot exceeds a threshold pressure; and
responsive to determining that the pressure exerted on the respective portion of the foot exceeds the threshold pressure, (i) incrementally increasing the compressibility of the respective bladder in predetermined increments and (ii) incrementally decreasing the compressibility of one or more bladders different from the respective bladder in predetermined increments, thereby offloading pressure from the respective portion of the foot to a different portion of the foot.

15. The method of claim 14, wherein each bladder of the plurality of bladders includes (i) a fluid having a compressibility that varies based on an electromagnetic field applied to the fluid and (ii) a controllable electromagnetic source configured to apply a variable electromagnetic field to the fluid, wherein increasing the compressibility of the respective bladder comprises causing the electromagnetic source of the respective bladder to adjust the electromagnetic field applied to the fluid of the respective bladder, and wherein decreasing the compressibility of the one or more bladders different from the respective bladder comprises causing the electromagnetic source of the one or more bladders different from the respective bladder to adjust the electromagnetic field applied to the fluid of the one or more bladders different from the respective bladder.

16. The method of claim 14, wherein each bladder of the plurality of bladders includes a fluid, wherein the compressibility of each bladder depends on an amount of the fluid in the bladder, wherein increasing the compressibility of the respective bladder comprises causing a pump to pump the fluid from the respective bladder, and wherein decreasing the compressibility of the one or more bladders different from the respective bladder comprises causing the pump to pump the fluid to the one or more bladders different from the respective bladder.

17. The method of claim 14, further comprising, prior to performing the compressibility adjustment process, adjusting the compressibility of each bladder to a baseline compressibility, wherein the baseline compressibility is approximately equal to a compressibility of the insole.

18. The method of claim 14, further comprising selecting a value of the threshold pressure based on (i) a user-specified value or (ii) which respective bladder of the plurality of compressible bladders the compressibility adjustment process is being performed for.

19. The method of claim 14, wherein the threshold pressure is a first threshold pressure, and wherein (i) incrementally increasing the compressibility of the respective bladder in predetermined increments and (ii) incrementally decreasing the compressibility of the one or more bladders different from the respective bladder in predetermined increments comprises:
   increasing the compressibility of the respective bladder by a first predetermined increment,
   receiving, from a second respective pressure sensor associated with the one or more bladders different from the respective bladder, a second signal indicative of a second pressure exerted on a second respective portion of the foot;
   determining, based on the second signal, that the pressure exerted on the second respective portion of the foot is below a second threshold pressure; and
   responsive to determining that the pressure exerted on the second respective portion of the foot is below the second threshold pressure, decreasing the compressibility of the one or more bladders different from the respective bladder by a second predetermined increment.

20. The system of claim 13, wherein the threshold pressure is a first threshold pressure, and wherein (i) incrementally increasing the compressibility of the respective bladder in predetermined increments and (ii) incrementally decreasing the compressibility of the one or more bladders different from the respective bladder in predetermined increments comprises:
   increasing the compressibility of the respective bladder by a first predetermined increment;
   receiving, from a second respective pressure sensor associated with the one or more bladders different from the respective bladder, a second signal indicative of a second pressure exerted on a second respective portion of the foot;
   determining, based on the second signal, that the pressure exerted on the second respective portion of the foot is below a second threshold pressure; and
   responsive to determining that the pressure exerted on the second respective portion of the foot is below the second threshold pressure, decreasing the compressibility of the one or more bladders different from the respective bladder by a second predetermined increment.

\* \* \* \* \*